April 15, 1947.    A. SIMMON    2,418,992
PHOTOGRAPHIC CAMERA WITH MOVABLE FILM CARRIER
Filed June 3, 1946    8 Sheets-Sheet 1
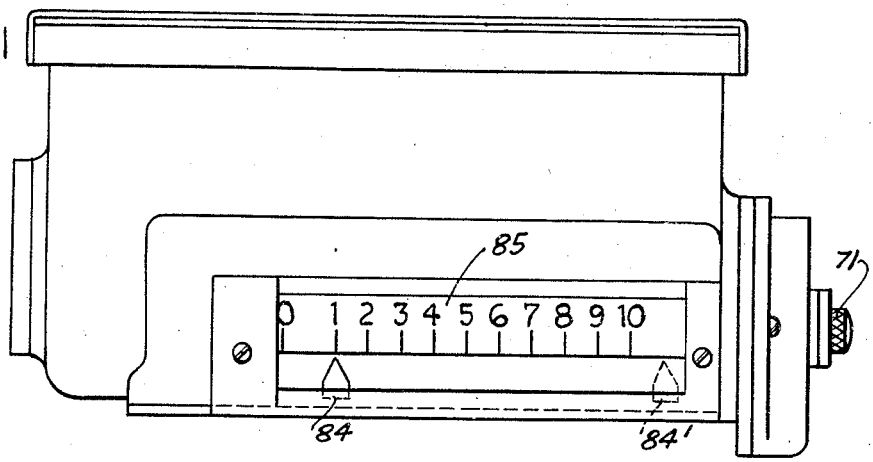
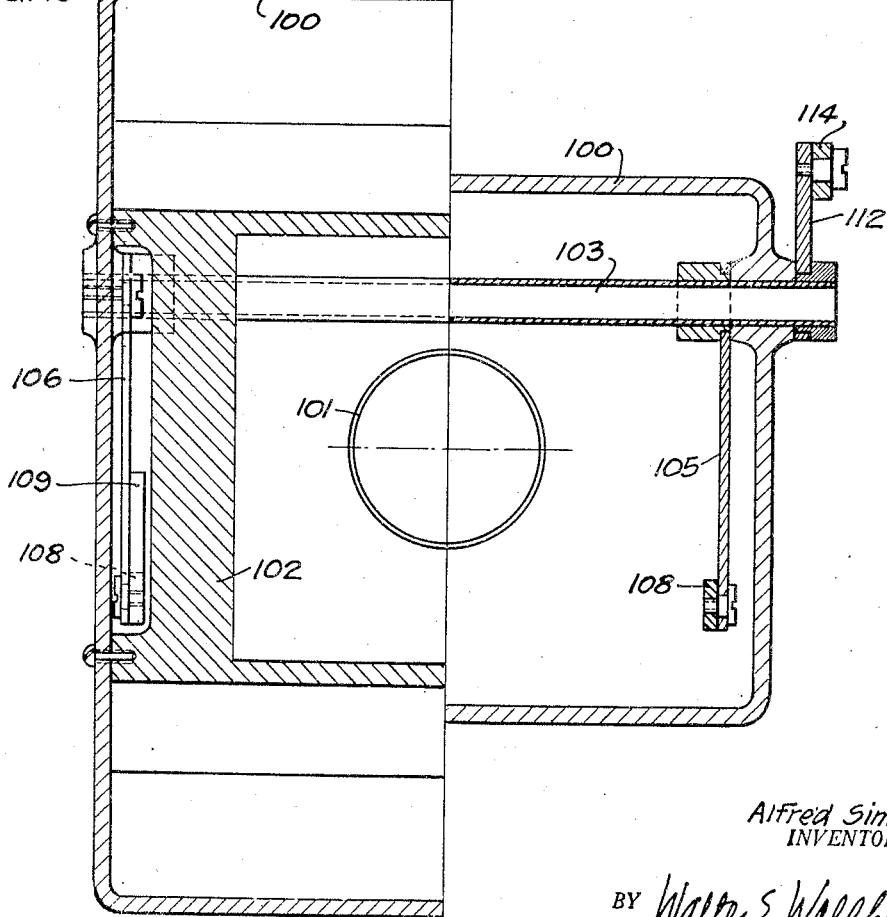
Alfred Simmon
INVENTOR.
BY Walter E. Wallheim
ATTORNEY April 15, 1947. A. SIMMON 2,418,992
PHOTOGRAPHIC CAMERA WITH MOVABLE FILM CARRIER
Filed June 3, 1946 8 Sheets-Sheet 2

INVENTOR.
Alfred Simmon
BY Walter S. Wallheim
ATTORNEY

April 15, 1947.  A. SIMMON  2,418,992
PHOTOGRAPHIC CAMERA WITH MOVABLE FILM CARRIER
Filed June 3, 1946  8 Sheets-Sheet 3
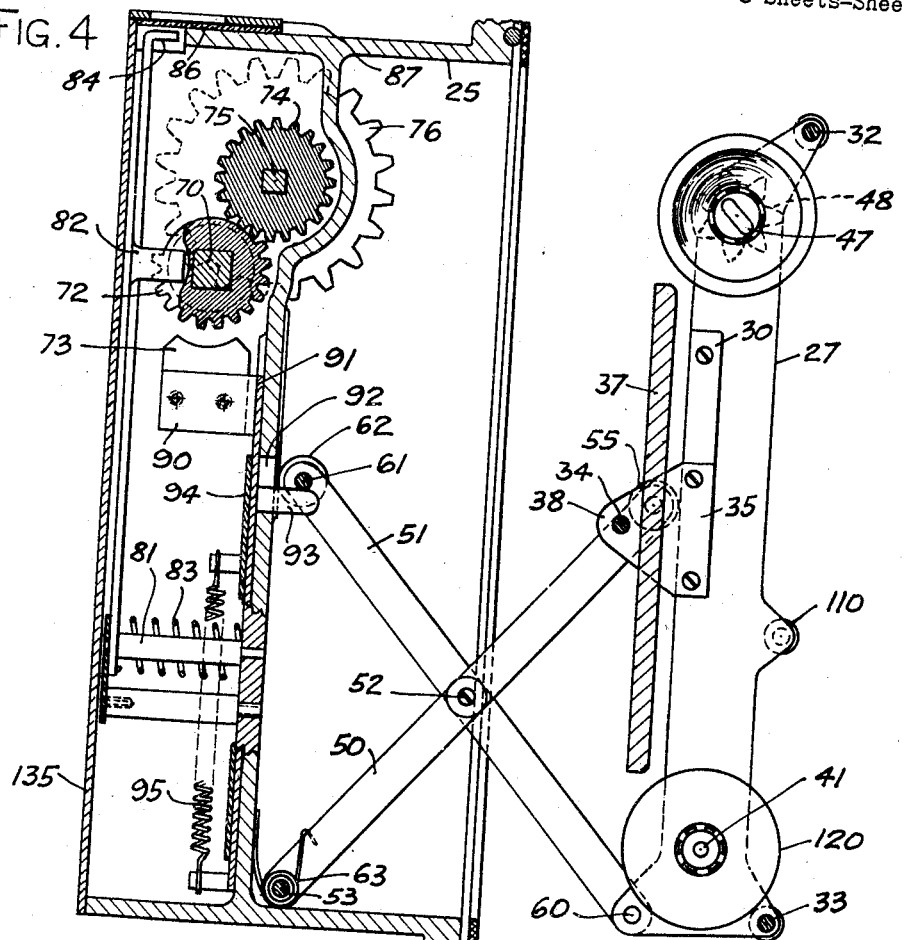
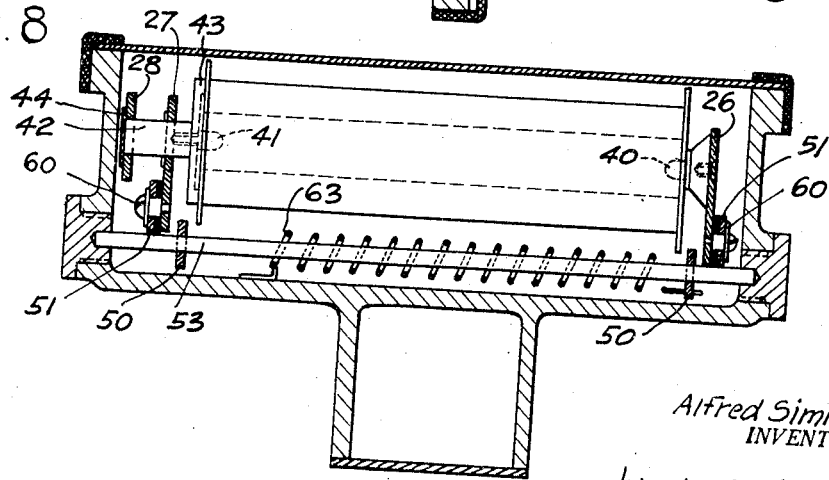
Alfred Simmon
INVENTOR.
BY Walter E. Wollheim
ATTORNEY

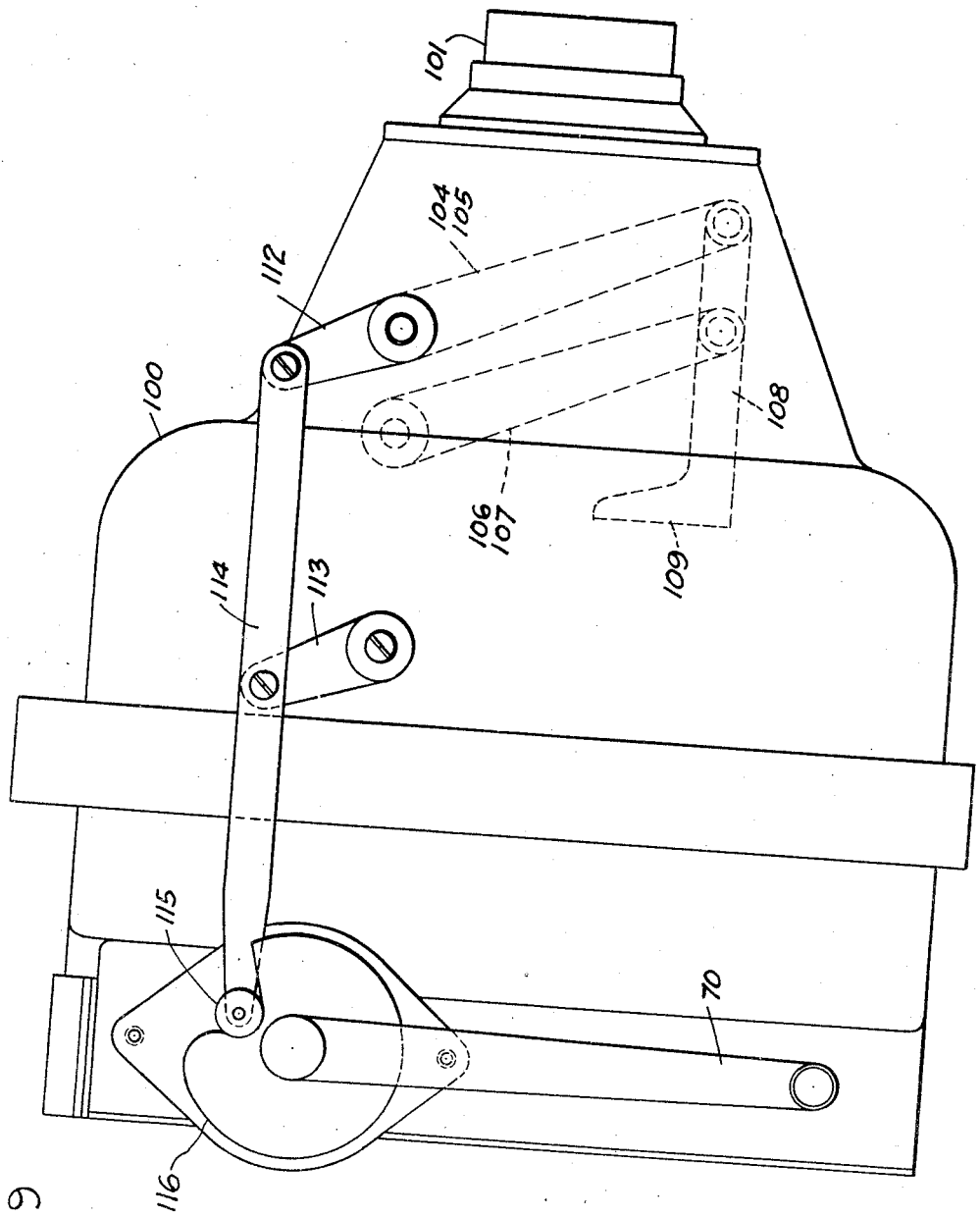

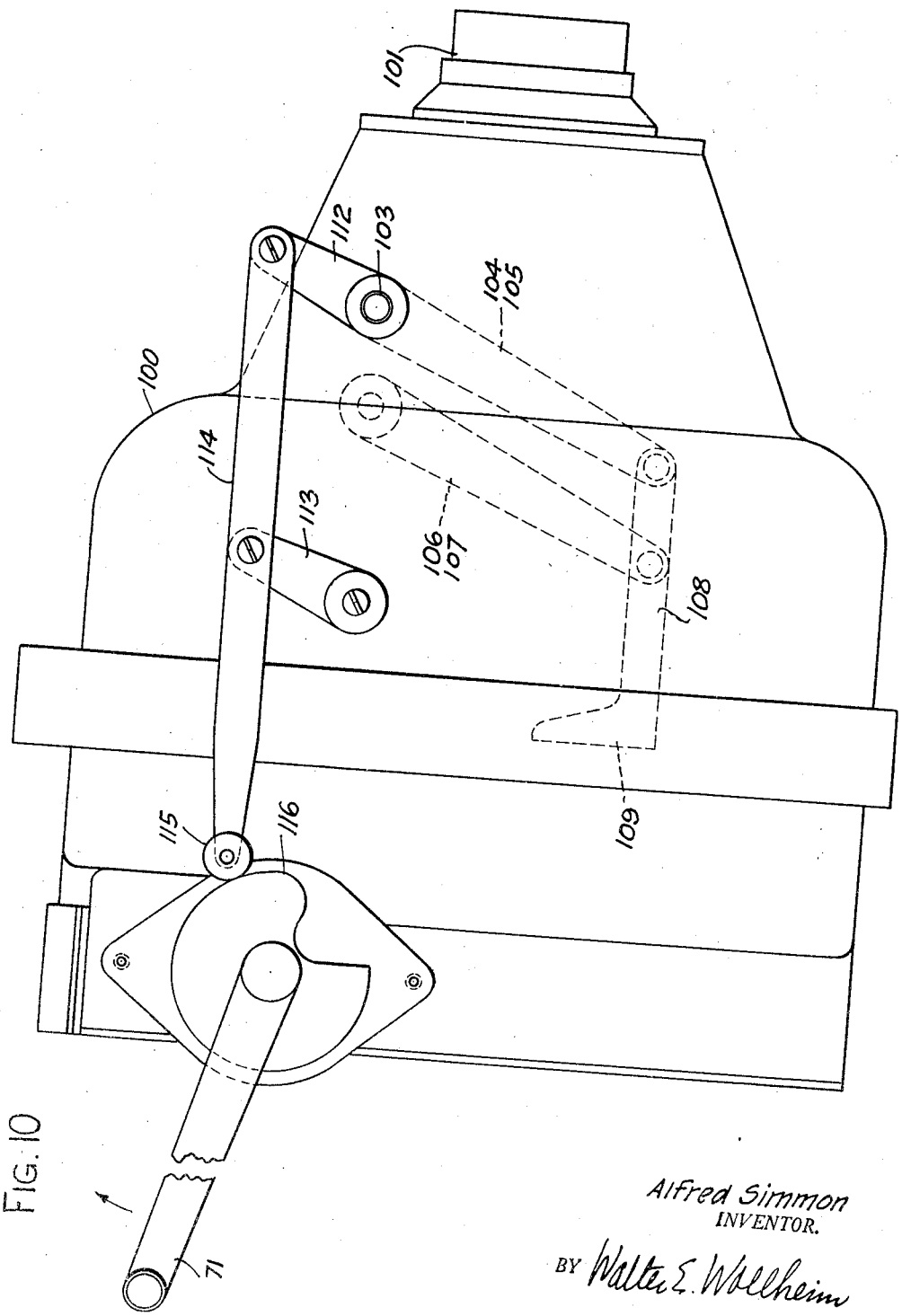

April 15, 1947.   A. SIMMON   2,418,992
PHOTOGRAPHIC CAMERA WITH MOVABLE FILM CARRIER
Filed June 3, 1946   8 Sheets-Sheet 7

Alfred Simmon
INVENTOR

BY Walter E. Wallheim
ATTORNEY

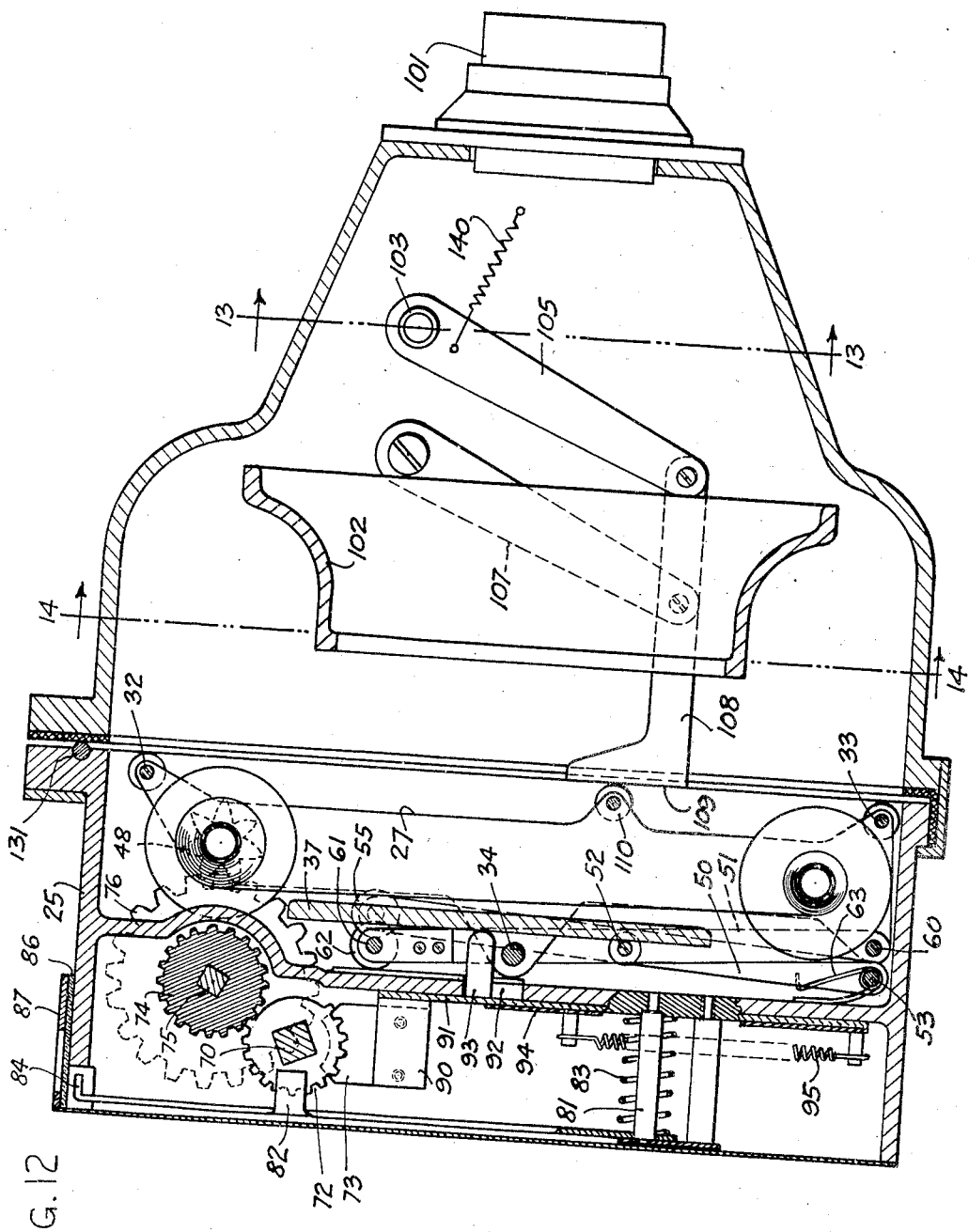

Patented Apr. 15, 1947

2,418,992

UNITED STATES PATENT OFFICE 2,418,992

PHOTOGRAPHIC CAMERA WITH MOVABLE FILM CARRIER

Alfred Simmon, Jackson Heights, N. Y., assignor to Simmon Brothers Inc., Long Island City, N. Y., a corporation of New York Application June 3, 1946, Serial No. 674,116

4 Claims. (Cl. 95—31)

The object of this invention is an improved camera with a detachable roll film magazine.

Means are provided to assure substantially uniform spacing of the exposure frames on the film while winding it, to assure flatness of the film during the exposure by placing it against an aperture plate, but automatically retracting it from this plate during the winding period, for counting the exposures, and for automatically resetting this exposure counter when the film is being exchanged. These objects are accomplished by providing a magazine with a housing divided into two compartments, the front compartment containing a film carrier including a film storage spool, a film receiving spool and a film backing plate, said film carrier being supported by a lazy tong assembly, the rear compartment containing a manually operated drive shaft, a train of gears including a peculiarly shaped screw gear, an exposure counter and a resetting device, and a camera containing in addition to the usual elements such as lens, shutter and others, an aperture plate positioned in the focal plane of the lens, and a lever system. This lever system is actuated by a cam mounted on the aforementioned drive shaft and shifts the film carrier during operation into a forward position for an exposure, in which position the film is sandwiched between the film backing plate and the aperture plate, and into a rearward position for winding, in which last named position the film carrier is in operative connection with the last gear of the aforementioned train of gears, the film at the same time being out of contact with the aperture plate.

A preferred embodiment of the camera is illustrated in the accompanying drawings in which Fig. 1 is a plan view of the camera;

Fig. 4 is a cross-sectional view along the plane of line 4—4 in Fig. 2, the dark slide being removed and the film carrier shown in its extreme forward position ready for an exchange of film spools;

Figure 2:
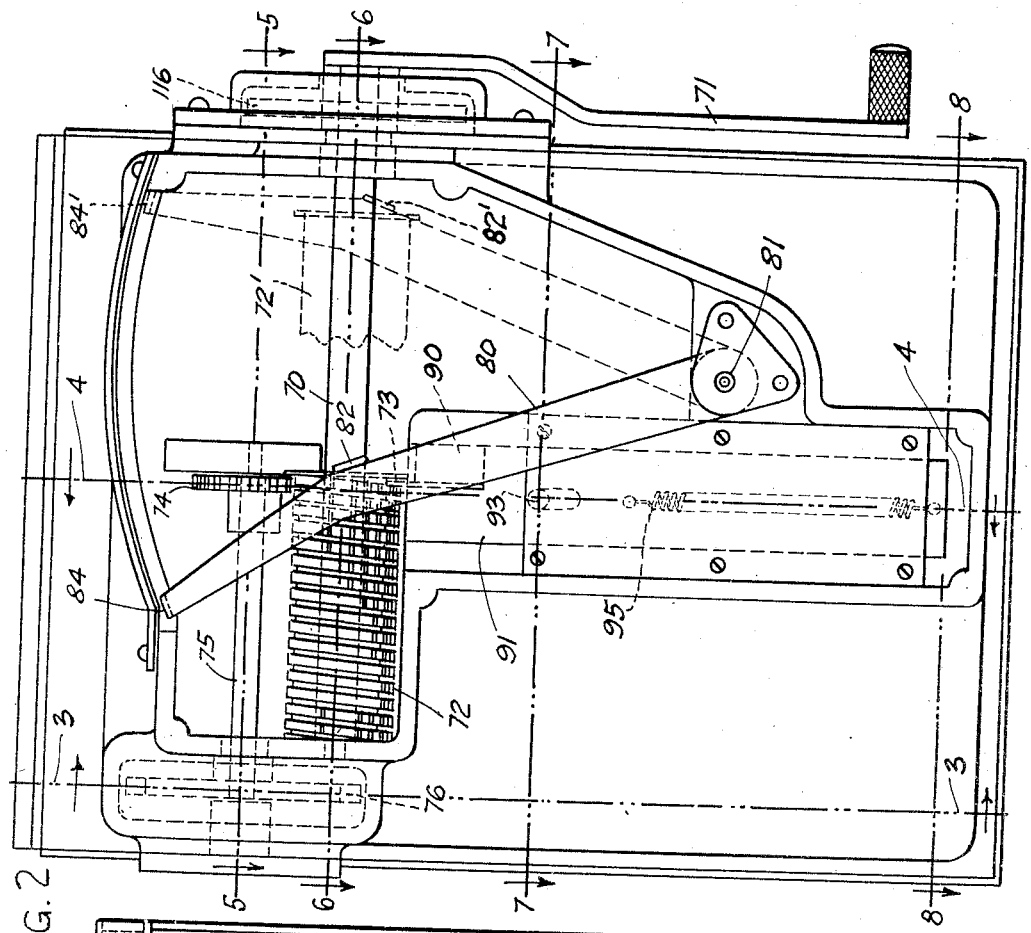
Fig. 2 is a rear view of the same with its cover removed.
Figure 11:
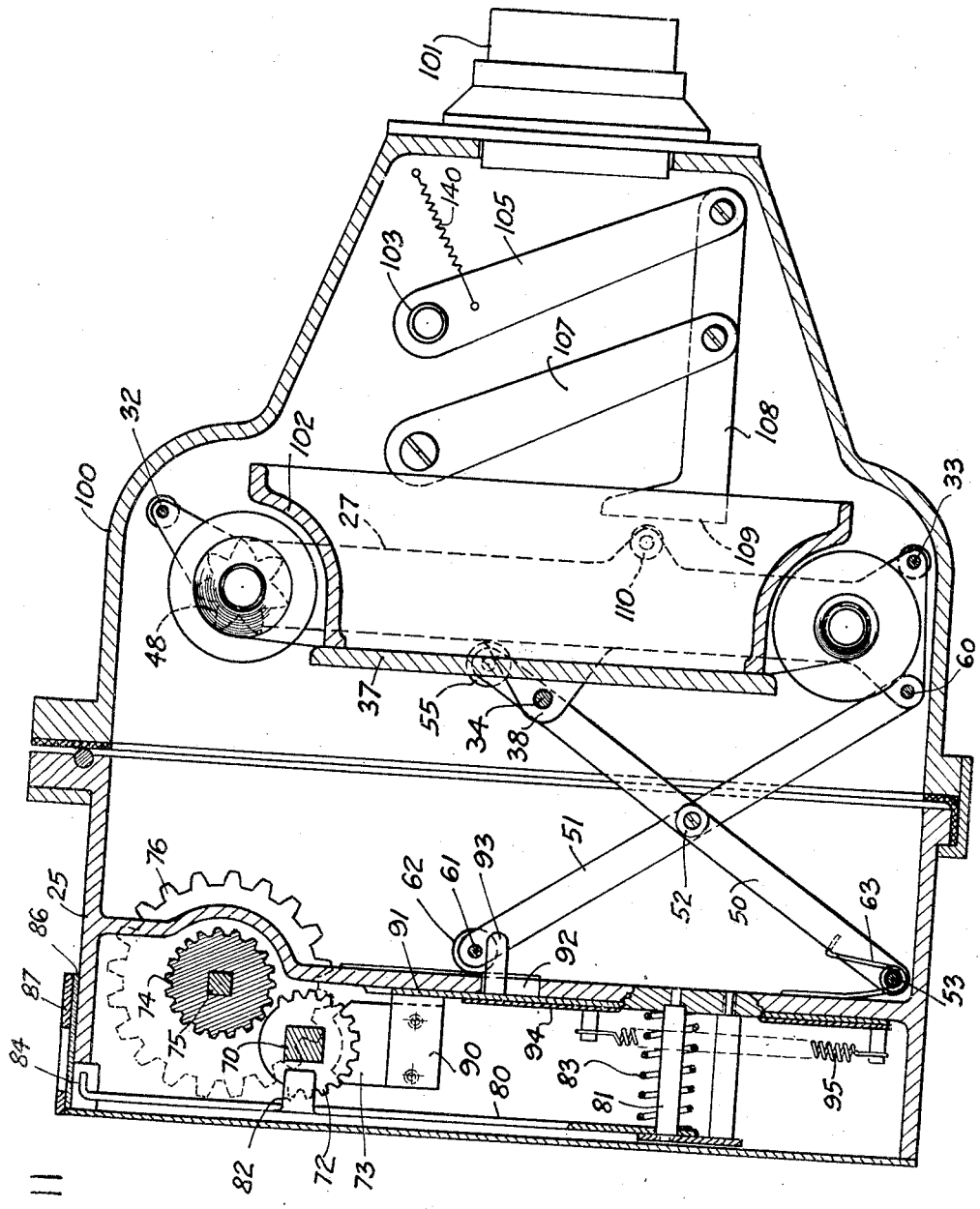

Figs. 5, 6, 7 and 8 are horizontal cross-sectional views along, respectively, the planes of lines 5—5, 6—6, 7—7 and 8—8 as indicated in Fig. 2;

Figs. 9 and 10 are side views of the camera in the exposure taking and film winding positions, respectively;

Figs. 11 and 12 are cross-sectional views through the camera in the exposure taking and film winding positions, respectively; and Fig. 13 shows in its right half a cross-sectional view along the plane of line 13—13 in Fig. 12, and in its left half a cross-sectional view along the plane of line 14—14 in Fig. 12.

Like characters of reference denote similar parts throughout the drawings and the following specification.

ROLL FILM MAGAZINE

*Front compartment*

The main part of the magazine is the housing 25 which is divided into a front and a rear compartment. Within the front compartment is a film carrier which comprises a frame supporting the film spools and the film backing plate. The frame consists of a right side plate 26 and two left side plates 27 and 28. Fastened to the plates 27 and 28 are two spacers 29 and 30, and fastened to the side plate 26 is a spacer 31. The side plates are connected by shafts 32 and 33, in front, and by shaft 34, in the rear, which serves at the same time as a support for the film backing plate. Shaft 34 is supported by two small plates 35 and 36, which, in turn, are fastened to plates 26 and 27, respectively, see Fig. 7. The film backing plate 37 is shown to be of substantially flat shape and equipped with two lugs 38 and 39, Fig. 7, by means of which the film backing plate may swivel on shaft 34. Attached to the frame of the film carrier are provisions to mount the film spools. The film storage spool is mounted in the way shown in Fig. 8 between a stationary pivot 40 and a retractable pivot 41. This retractable pivot is fastened to a shaft 42 which has two flat sides and which fits into corresponding holes in plates 27 and 28 so that it is free to move axially without rotating. Fastened to shaft 42 is a flat disc 43, see Fig. 8, which presses against the flange of the film storage spool, thereby acting as a brake. A leaf spring 44 is provided which presses the entire assembly consisting of shaft 43, disc 42 and pivot 41 against the flange of the film storage spool. The film receiving spool is mounted in the manner shown in Fig. 5. Again a stationary pivot 45 is provided which is fastened to plate 26. The other end of the film receiving spool is supported by a retractable key 46 which, in turn, is part of the flattened shaft 47. This flattened shaft 47 fits into a corresponding hole in a gear 48 and is pressed forward against the flange of the film spool by a leaf spring 49. The gear 48 serves to drive the film receiving spool by means to be described later.

Two sets of three small rollers 110 each are mounted on the front face of the film carrier. The purpose of these rollers is to facilitate insertion and withdrawal of the dark slide. The rollers in the middle also serve to cooperate with the lever system of the camera to be described below.

Figure 6:
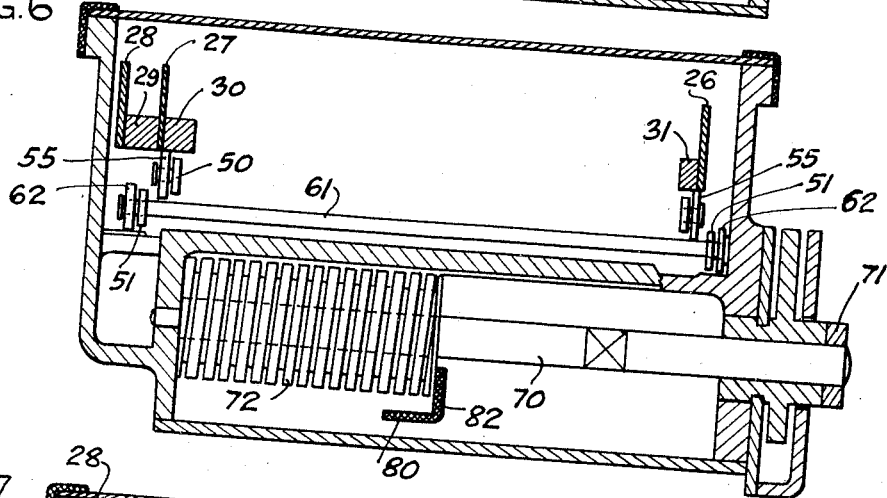
Figure 7:
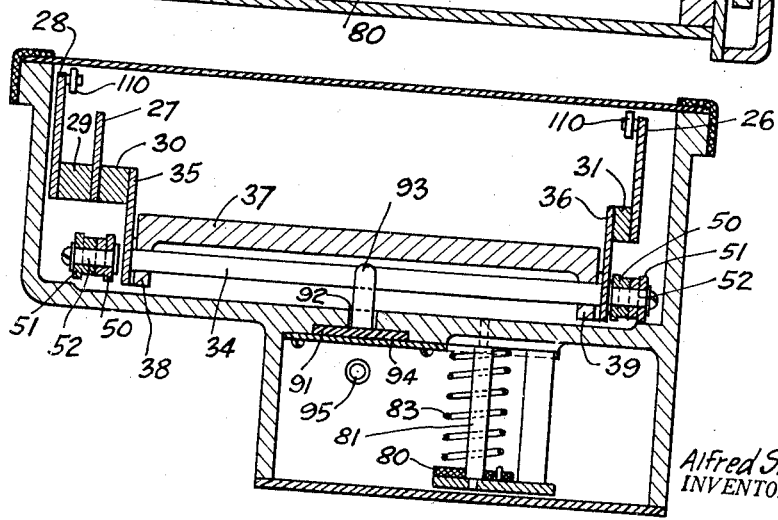

The film carrier is movably supported by a lazy tong assembly. This lazy tong assembly consists of two parallel sets of levers, each set comprising a first and a second lever. Referring to Fig. 4, one of the first levers is shown as 50, and one of the second levers is shown as 51. They are hinged together in the middle by a pivot 52. One end of the first lever 50 is fastened to a shaft 53 which is rotatably supported within the front compartment of the housing of the film magazine. The other end of the first lever 50 is free to slide in contact with the frame of the film carrier in a vertical direction, i. e., in a direction at right angles to the axis of the camera lens. In order to facilitate this movement, these ends of levers 50 are equipped with rollers 55 which are in contact with either spacer 30 or with spacer 31, Fig. 6. One end of the second lever 51 is rotatably connected to the frame of the film carrier by means of a pivot 60, and the other end of this second lever of either set is connected to a shaft 61, and the ends of these second levers 51 are free to slide in contact with the housing of the film magazine in a vertical direction, i. e., in a direction at right angles with the axis of the camera lens. This is facilitated by wheels 62 as shown in Fig. 6. A spring 63 is wound around shaft 53 in such a manner that it urges the entire film carrier forwardly, i. e., unless the film carrier is restricted by some means it will assume the position shown in Fig. 4. This position will, in the future, be called the extreme forward position.

When the magazine is detached from the camera it is closed in the conventional manner with a dark slide 130. Any small gap between this dark slide and the housing is closed by a strip of felt 131 which also covers the slot which would otherwise admit light after the withdrawal of the dark slide when the magazine is attached to the camera.

*Rear compartment*

The rear compartment contains the film advancing means, the exposure counter and the resetting device.

Figure 3:
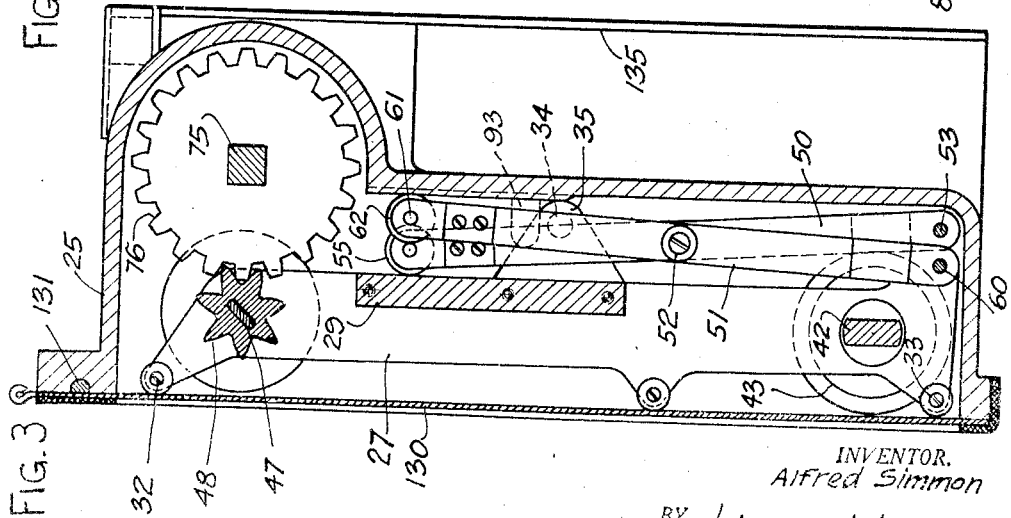
Fig. 3 is a cross-sectional view along the plane of line 3—3 in Fig. 2, the film carrier being shown in the retracted position and the magazine closed by a dark slide.
Figure 5:
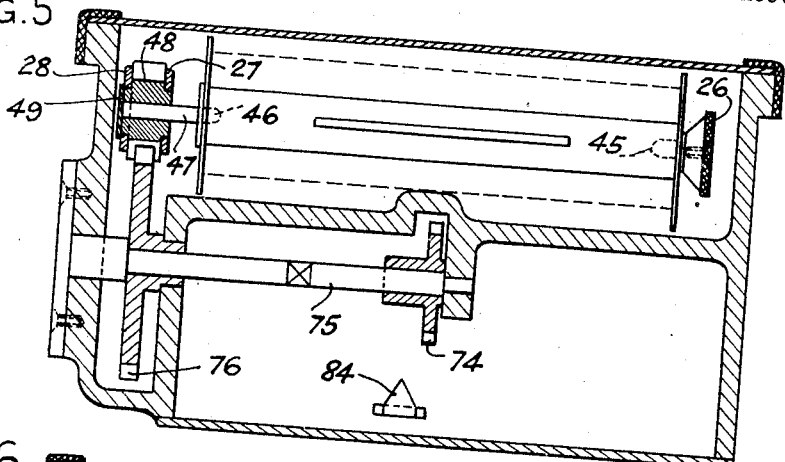

*Film advancing means.*—The film advancing means comprise a manually driven shaft 70 which may be turned by the operator by means of crank 71. This shaft is shown to be of square cross-section, but it will be understood that any other cross-section may be used as long as said cross-section is not round. The expression "unround" has been used in the appended claims in order to denote a cross-section which may be any desired configuration as long as it is not a circle. Driven by and mounted on this shaft is a peculiar gear like element which has been fully disclosed in Patent No. 2,340,624 issued to me on February 1, 1944, and which shall be called a screw gear. This element consists essentially of a cylindrical body with a plurality of helical convolutions, a plurality of teeth in said convolutions, said teeth decreasing in number in adjacent convolutions. This screw gear 72 has a square hole and is free to move axially on shaft 70 but is, of course, forced to rotate with it. Its axial movement is restricted by a shoe 73 which fits into the space between two adjacent convolutions. This shoe has the same effect as a nut on a lead screw and forces the screw gear to slide axially on shaft 70 upon rotation of said shaft. In the position shown in Fig. 2 the screw gear assumes its initial position, i. e., film has just been inserted into the magazine, and the exposure counter reads zero. Rotation of shaft 70 will cause screw gear 72 to shift axially from the extreme left position as shown towards the right until eventually it assumes the extreme right position 72' shown in dotted lines. The fact that the number of teeth per convolution decreases, i. e., that more and more teeth per convolution have been removed, serves as a compensation for the fact that the film receiving spool increases in diameter as film is wound onto it, and by means of this compensation substantially uniform spacing of subsequent exposure frames is assured. For a detailed explanation of the screw gear and its function, I wish to refer to my aforementioned Patent No. 2,340,624. One of the convolutions of this screw gear is in mesh with gear 74 which is mounted on shaft 75. A second but larger gear 76 is mounted on the same shaft, and this gear 76, in turn, meshes with the aforementioned gear 48 which drives the film receiving spool. As can be seen in Figs. 3, 4 and 5, the left end of shaft 75 protrudes through the wall of the film housing so that gear 74 is contained within the rear compartment, but gear 76 works in the front compartment of the film magazine housing. It can be seen in Figs. 2, 3 and 4 that the housing is shaped in such a way that a pocket is formed on the left side which is part of the front compartment and which accommodates gear 76.

*Exposure counter.*—The axial movement of screw gear 72 can be utilized in an extremely simple manner to provide an exposure counter. A lever 80 is rotatably mounted on shaft 81 and is equipped with an abutment 82 which is in contact with the right face of screw gear 72. A spring 83 is wound around shaft 81 in such a way that it tends to rotate lever 80 in a counter-clockwise position, i. e., abutment 82 is always pressing against the right face of screw gear 72 tending to return it to its initial position shown in Fig. 2. The shoe 73 which engages the screw gear between two convolutions ordinarily prevents the lever 80 for returning this screw gear to its starting position. The extreme end of lever 80 has a mark 84 which is visible through a slot of the housing and which indicates on a scale 85 the axial position of screw gear 72 and thereby the exposure frame which, at any given time, is ready for an exposure within the magazine. The slot in the magazine housing is, of course, closed by a transparent sheet of plastic material or the like. This sheet of plastic material can be seen in Fig. 4 and is called 86. It is fastened to the housing 25 by means of a protective sheet metal frame 87.

*Resetting device.*—From the foregoing description it will be clear that the simple removal of shoe 73 will permit screw gear 72 to slide freely on shaft 70 or, in other words, as soon as shoe 73 is withdrawn, lever 80, biased by spring 83, will push screw gear 72 to the left and back into the position shown in Fig. 2. Shoe 73 is mounted to a block 90 which, in turn, is fastened to a plate 91 which is free to slide in a groove milled into the dividing wall of the magazine housing. This wall has a slot 92 permitting a pin 93, fastened to the plate 91, to protrude into the front compartment of the magazine. The groove in which plate 91 slides is closed by a cover plate 94. A spring 95 is fastened to the lower end of plate 91 forcing it upwardly and pressing shoe 73 into the space between two adjacent convolutions of screw gear 72. The pin 93 is so positioned that it is ordinarily, i. e., during operation and when the magazine is attached to the camera, out of reach of the shaft 61 which is part of the lazy tong assembly described above and which is free to slide in contact with the dividing wall of the magazine in a direction at right angles to the axis of the camera lens. In the extreme forward position, shown in Fig. 4, however, i. e., in the position which the film carrier will assume as soon as the magazine is opened when it is unattached to the camera and in which position the operator may exchange film spool freely, shaft 61 will come in contact with pin 73 and depress it in the manner shown in Fig. 4. Depressing pin 93, of course, withdraws plate 91 and with it shoe 73 which thereupon becomes disengaged from screw gear 72 permitting it to slide back from right to left into the initial position shown in Fig. 2. The rear compartment of the magazine is closed by a cover plate 135.

CAMERA

The main part of the camera is the housing 100 to which all other parts are attached. This housing is shown to be of one piece construction, but it will be understood that, in reality, it may be manufactured from several parts in order to facilitate manufacture and assembly. It will also be understood that in Figs. 9 to 17 the camera is shown in a somewhat simplified form illustrating only the lens 101, but not certain other parts which, in reality, will form part of the camera such as a shutter, view finder and others. These parts have been omitted in the interest of clarity since they do not form part of this invention.

There are two elements attached to the camera housing which are important in connection with this invention, i. e., the aperture plate 102 and the lever system.

The aperture plate is shown to be stationary with respect to the camera housing, but if desired, it is easily possible to provide means to adjust its position within the housing for focusing purposes. The magazine as described lends itself excellently to an arrangement of this type since the film carrier, being urged forwardly by a spring, will follow the aperture plate to whatever position it may assume. An arrangement of this type is diclosed in Patent No. 2,386,575 issued to Alfred Simmon et al. on October 9, 1945. This feature has been omitted from the present specifications since it does not form part of this invention. The lever system consists of a main shaft 103 to which levers 104 and 105 are connected on either side. A second set of levers 106 and 107 are provided in parallel relationship to the aforementioned levers 104 and 105, but they need not be mounted on a common shaft and, as a matter of fact, individual pivots are preferable since a common shaft may get into the cone of light between the lens and the film. The front ends of these levers are pivotally connected to connecting rods 108 which terminate in a flat surface 109. This flat surface, during operation, comes in contact with a small roller 110 fastened to the side plates of the film carrier as described above.

Fixedly mounted on shaft 103 is a relatively short lever 112 which is mounted on the outside of the camera. A similar lever 113 is also mounted on the outside of the camera in parallel relationship to lever 112, and both levers are pivotally connected to the connecting rod 114 which terminates in a roller 115. The entire assembly is biased by a spring 140 and actuated by a cam 116 which is mounted on drive shaft 70 of the film advancing mechanism as described above and which is rotated by the operator by means of crank 71. The shape of the cam can be seen in Figs. 9 and 10. This shape permits the operator to turn crank 71 in a clockwise direction thereby shifting roller 115 and therewith the entire lever system from the position shown in Fig. 9 into the position shown in Fig. 10. However, it is impossible for the operator to turn crank 71 from the rest position shown in Fig. 9 in a counter-clockwise position, which automatically assures the proper direction of rotation.

OPERATION

The magazine, when detached from the camera, will be closed by the dark slide or, in other words, it will be in the condition shown in Fig. 3. In order to insert the film, the dark slide will be withdrawn, whereupon the film carrier will be urged forward by coil spring 63 and will assume the extreme forward position shown in Fig. 4. In this position the film spools may be exchanged with convenience, and a loaded film spool will be inserted by the operator in the lower position, and an empty film receiving spool will be inserted in the upper position. The insertion of both spools is made possible by the axial movement of elements 42 and 47, respectively, which may be shifted axially by merely pushing the film spools in contact with them a small distance and then permitting them to snap into position, supported on one side by the fixed pivots 40 and 45, respectively, and on the other side by the film key 46 and the pivot 41, respectively. The free end of the film is then taken from the loaded lower spool and inserted in the conventional manner in the slot of the film receiving spool. The film used in this magazine will usually be of the so-called paper backed type, and this paper generally has a suitable mark such as a picture of a warning hand to indicate to the operator how far he can wind without prematurely exposing film. With this magazine the operator merely turns the upper film receiving spool a few times until the picture of the warning hand appears approximately at point 120 in Fig. 4. The operator then pushes the film carrier back into the front compartment of the magazine and inserts the dark slide again so that the loaded magazine again is in the condition shown in Fig. 3.

The exposure counter will then be in the zero position and the operator merely turns the handcrank a few times until the pointer indicates No. 1 on the exposure counting scale which means that the first frame is ready for an exposure. This may be done either before or after the magazine has been attached to the camera body.

After the magazine has been attached to the camera exposures may be taken, and after each exposure the film will be advanced by the operator by one frame by merely turning the crank 71 one revolution. This will cause shaft 70 and therewith screw gear 72 to rotate one revolution. Screw gear 72 has a decreasing number of teeth on each subsequent convolution and, therefore, makes gear 74 rotate by a similar and smaller angle for subsequent exposures. In this manner a substantially uniform spacing of the exposure frames is being assured since this smaller and smaller angle of rotation compensates for the larger and larger diameter of the film receiving spool which grows as film is wound onto it. Gear 74 rotates shaft 75 and therewith the larger gear 76 which, in turn, cooperates with gear 48 on the film carrier. Gear 48 causes the rotation of part 47 and therewith film key 46 which, in turn, rotates the film receiving spool.

The cooperation between the film winding mechanism, the cam 116 and the lever system and the film carriage can be seen in Figs. 9, 10, 11 and 12. Figs. 9 and 11 show the camera ready for an exposure. Cam 116 permits roller 115 to assume an extreme position to the left thereby causing all levers to assume the position shown in Figs. 9 and 11 which means that part 108 with its face 109 is withdrawn as far to the right as possible. Roller 110 is, therefore, out of contact with face 109, and therefore, the entire film carrier biased by spring 63 is free to move forward until its progress towards the right is restricted by coming in contact with the aperture plate 102. As shown in Fig. 11 the film is now sandwiched between the left surface of aperture plate 102 and the film backing plate 37. It is, therefore, kept flat with a good degree of approximation in the focal plane of the lens, thereby assuring sharp pictures.

After the exposure has been taken, the operator turns crank 71, Fig. 10, causing rotation of cam 116 and pushing roller 115 to the right, causing the lever system to assume the position shown in Figs. 10 and 12. Part 108 with its face 109 moves to the left, pushing roller 110 and therewith the entire film carrier back into the front compartment of the film magazine until it assumes the position shown in Fig. 12. In this position the film is manifestly completely out of contact with the aperture plate so that its progress, while being wound, cannot in any way be impeded by friction, and scratches, all too frequent in other cameras, are completely impossible. Gear 43 is now in mesh with large gear 76.

In Figs. 4, 11 and 12, a cross-section through the screw gear 72 shows that a number of teeth have been removed for each individual convolution, the number of remaining teeth decreasing from each convolution to the next one. The minimum angle over which these teeth have been removed is as large or, preferably, slightly larger than the angle occupied by the effective part of cam 116, i. e., the screw gear 72 will come in mesh with the cooperating gear 74 only after roller 115 rides on the outer circumference of the long circular part of cam 116 or, in other words, screw gear 72 will not begin to rotate gear 74 until after cam 116 has pushed the entire lever system and therewith the film holder into the position shown in Fig. 12 in which the small gear 48 mounted on the film carrier is in mesh with the large gear 76 driven, in turn, by gear 74. Further rotation of crank 72 then causes the teeth of screw gear 72 to rotate gear 74. This rotary motion is then transmitted through shaft 75 to gear 76 and from there to gear 48 and through the film key to the film receiving spool.

As can be seen in Figs. 11 and 12, during this operation the shaft 61 which is part of the lazy tong assembly moves vertically between the low position shown in Fig. 11 and the high position shown in Fig. 12, but it never comes in contact with pin 93. Consequently, the position of plate 91, block 90 and shoe 73 remains unchanged during all these operations and shoe 73 is always in the position shown in Figs. 10 and 12, i. e., it is pressed into the space between two convolutions of screw gear 72. This means that screw gear 72 will perform a slight axial shift during each revolution. Returning to Fig. 2, it will be noted that due to this axial shift the right front face of gear 72 will push the abutment 82 of lever 80 more and more to the right until eventually this abutment and the lever assumes the position shown in dotted lines in Fig. 2, namely 82' and 80'.

As has been pointed out above, the extreme end of lever 80 is equipped with an indicating mark 84 which is visible from the exterior of the magazine and which shows on a stationary scale the number of the exposure frame which is ready for an exposure. Eventually, after all pictures have been taken, this mark will have the position shown in Figs. 1 and 2 in dotted lines which is designated 84'.

At this point the magazine is, of course, closed by the dark slide and detached from the camera. The operator gives the crank a few more turns to be sure that all the film is securely wound on the film receiving spool and then opens the magazine whereupon the film carrier immediately assumes again the position shown in Fig. 4 which has been called the extreme forward position. In this position, it is easy to detach the now loaded film receiving spool and insert new spools. As shown in Fig. 4, in this extreme forward position the shaft 61 of the lazy tong assembly assumes a position lower than the position shown in Fig. 11, i. e., during operation as attached to a camera. In this position shaft 64 comes in contact with pin 93 and depresses plate 91 against the tension of the spring 95 thereby causing the withdrawal of block 90 and shoe 73 from its position between the convolutions of the screw gear. Shoe 73 assumes now the position shown in Fig. 4, i. e., withdrawn from contact with the screw gear. This immediately makes it possible for the screw gear to slide axially on shaft 70 from the position at the extreme right 72' back into the position at the extreme left 72 shown in Fig. 2. The screw gear is propelled by the abutment 82 of lever 80 which, in turn, is rotated in a counter-clockwise position by the coil spring 83. In other words, as soon as the film carrier is permitted to assume its extreme forward position, shown in Fig. 4, the exposure counting pointer 84 snaps automatically back into zero position.

It is obvious that many changes of form, proportions and minor details of construction may be resorted to without departing from the principles or sacrificing any of the advantages of the invention as defined in the appended claims.

What I claim as new, is:

1. A camera with a detachable roll film magazine, said magazine comprising a housing containing a movable film carrier and film advancing means, said film carrier supporting a film storage spool, a take up spool, and a substantially flat film backing plate, said film advancing means comprising a manually rotatable shaft driving a cam and a train of gears, said camera comprising a housing containing an aperture plate and a system of levers, said system of levers, when said magazine is attached to said camera, being actuated by said cam and adapted to shift said film carrier into a forward position for an exposure, and into a rearward position for film winding, in the forward position the film being sandwiched between said film backing plate and said aperture plate, and said take up spool being out of operative engagement with said train of gears, in the rearward position the film being out of contact with said aperture plate, and said take up spool being in operative engagement with said train of gears, said movable film carrier, when said magazine is detached from said camera, adapted to assume a rearward position identical with the one described above, and an extreme forward position in which the film spools may be exchanged with convenience, said extreme forward position being farther forward than the above mentioned forward position of the film carrier when the magazine is attached to the camera, the housing for said magazine having two compartments, a rear compartment containing the train of gears of said film advancing means with the exception of the last gear, and a front compartment containing said last gear, said movable film carrier, and a lazy tong assembly supporting said film carrier and permitting it to move forwardly in the direction of the axis of the camera lens, said lazy tong assembly comprising two parallel sets of a first lever and of a second lever each, a first shaft having one end of each of said first levers fastened to it, said first shaft rotatably supported within the front compartment of said housing, the other end of each of said first levers adapted to slide in contact with said film carrier in a direction at right angles to the axis of the camera lens, and the center of each of said first levers pivotally connected to the center of the corresponding second lever, one end of each of said second levers rotatably connected to said film carrier, and a second shaft having the other end of each of said second levers connected to it, said second shaft adapted to slide in contact with said housing in a direction at right angles to the axis of the camera lens.

2. A camera with a detachable roll film magazine, said magazine comprising a housing containing a movable film carrier and film advancing means, said film carrier supporting a film storage spool, a take up spool, and a substantially flat film backing plate, said film advancing means comprising a manually rotatable shaft driving a cam and a train of gears, said camera comprising a housing containing an aperture plate and a system of levers, said system of levers, when said magazine is attached to said camera, being actuated by said cam and adapted to shift said film carrier into a forward position for an exposure, and into a rearward position for film winding, in the forward position the film being sandwiched between said film backing plate and said aperture plate, and said take up spool being out of operative engagement with said train of gears, in the rearward position the film being out of contact with said aperture plate, and said take up spool being in operative engagement with said train of gears, said movable film carrier, when said magazine is detached from said camera, adapted to assume a rearward position identical with the one described above, and an extreme forward position in which the film spools may be exchanged with convenience, said extreme forward position being farther forward than the above mentioned forward position of the film carrier when the magazine is attached to the camera, the housing for said magazine having two compartments, a rear compartment containing the train of gears of said film advancing means with the exception of the last gear, and a front compartment containing said last gear and said movable film carrier, one gear of said train of gears being a screw gear consisting of a cylindrical body having a plurality of helical convolutions, a plurality of uniform teeth in said convolutions, said teeth decreasing in number in adjacent convolutions, said cylindrical body having an unround hole and adapted to slide axially on an unround shaft, and a shoe supported within the rear compartment of said housing and adapted to fit into the space between two adjacent convolutions, and a spring biased pivoted lever, mounted rotatably within said rear compartment and having an abutment between its pivot and its extreme end, said abutment being in contact with the face of said screw gear and urging it to return to its initial position, and said extreme end being visible from the exterior of the magazine and indicating on a stationary scale the lateral position of said screw gear and thereby serving as an exposure counter.

3. A camera with a detachable roll film magazine, said magazine comprising a housing containing a movable film carrier and film advancing means, said film carrier supporting a film storage spool, a take up spool, and a substantially flat film backing plate, said film advancing means comprising a manually rotatable shaft driving a cam and a train of gears, said camera comprising a housing containing an aperture plate and a system of levers, said system of levers, when said magazine is attached to said camera, being actuated by said cam and adapted to shift said film carrier into a forward position for an exposure, and into a rearward position for film winding, in the forward position the film being sandwiched between said film backing plate and said aperture plate, and said take up spool being out of operative engagement with said train of gears, in the rearward position the film being out of contact with said aperture plate, and said take up spool being in operative engagement with said train of gears, said movable film carrier, when said magazine is detached from said camera, adapted to assume a rearward position identical with the one described above, and an extreme forward position in which the film spools may be exchanged with convenience, said extreme forward position being farther forward than the above mentioned forward position of the film carrier when the magazine is attached to the camera, the housing for said magazine having two compartments, a rear compartment containing the train of gears of said film advancing means with the exception of the last gear, and a front compartment containing said last gear and said movable film carrier, one gear of said train of gears being a screw gear consisting of a cylindrical body having a plurality of helical convolutions, a plurality of uniform teeth in said convolutions, said teeth decreasing in number in adjacent convolutions, said cylindrical body having an unround hole and adapted to slide axially on an unround shaft, a spring biased slide within said rear compartment, and a shoe mounted upon said slide and being pressed into the space between two adjacent convolutions, a spring biased pivoted lever, mounted rotatably within said rear compartment and having an abutment between its pivot and its extreme end, said abutment being in contact with the face of said screw gear and urging it to return to its initial position, said extreme end being visible from the exterior of the magazine and indicating on a stationary scale the lateral position of said screw gear and thereby serving as an exposure counter, and means to depress said slide against the force of its biasing spring when said movable film carrier assumes its extreme forward position, whereby said slide disengages said shoe from said screw gear, which is thereupon being returned to its initial position by said spring biased lever, the extreme end of said lever returning at the same time to the zero position on said exposure counting scale.

4. A camera with a detachable roll film magazine, said magazine comprising a housing containing a movable film carrier and film advancing means, said film carrier supporting a film storage spool, a take up spool, and a substantially flat film backing plate, said film advancing means comprising a manually rotatable shaft driving a cam and a train of gears, said camera comprising a housing containing an aperture plate and a system of levers, said system of levers, when said magazine is attached to said camera, being actuated by said cam and adapted to shift said film carrier into a forward position for an exposure, and into a rearward position for film winding, in the forward position the film being sandwiched between said film backing plate and said aperture plate, and said take up spool being out of operative engagement with said train of gears, in the rearward position the film being out of contact with said aperture plate, and said take up spool being in operative engagement with said train of gears, said movable film carrier, when said magazine is detached from said camera, adapted to assume a rearward position identical with the one described above, and an extreme forward position in which the film spools may be exchanged with convenience, said extreme forward position being farther forward than the above mentioned forward position of the film carrier when the magazine is attached to the camera, the housing for said magazine having two compartments and a dividing wall, a rear compartment containing the train of gears of said film advancing means with the exception of the last gear, and a front compartment containing said last gear, said movable film carrier, and a lazy tong assembly supporting said film carrier and permitting it to move forwardly in the direction of the axis of the camera lens, said lazy tong assembly comprising two parallel sets of a first lever and of a second lever each, a first shaft having one end of each of said first levers fastened to it, said first shaft rotatably supported within the front compartment of said housing, the other end of each of said first levers adapted to slide in contact with said film carrier in a direction at right angles to the axis of the camera lens, and the center of each of said first levers pivotally connected to the center of the corresponding second lever, one end of each of said second levers rotatably connected to said film carrier, and a second shaft having the other end of each of said second levers connected to it, said second shaft adapted to slide in contact with said housing in a direction at right angles to the axis of the camera lens, one gear of said train of gears being a screw gear consisting of a cylindrical body having a plurality of helical convolutions, a plurality of uniform teeth in said convolutions, said teeth decreasing in number in adjacent convolutions, said cylindrical body having an unround hole and adapted to slide axially on an unround shaft, a spring biased slide within said rear compartment, and a shoe mounted upon said slide and being pressed into the space between two adjacent convolutions, a projection fastened to said slide and extending through a slot of said dividing wall into the front compartment of the housing, a spring biased pivoted lever, mounted rotatably within said rear compartment and having an abutment between its pivot and its extreme end, said abutment being in contact with the face of said screw gear and urging it to return to its initial position, and said extreme end being visible from the exterior of the magazine and indicating on a stationary scale the lateral position of said screw gear and thereby serving as an exposure counter, said projection being out of operative contact with said second shaft of the lazy tong assembly when said magazine is attached to the camera and the film carrier is either in its forward or its rearward position, but being in operative contact with and being depressed by said second shaft when said magazine is detached from said camera and said film carrier is in its extreme forward position, whereby said slide disengages said shoe from said screw gear, which is thereupon being returned to its initial position by said spring biased lever, the extreme end of said lever returning at the same time to the zero position on said exposure counting scale.

ALFRED SIMMON.

REFERENCES CITED

The following references are of record in the file of this patent:

UNITED STATES PATENTS

| Number | Name | Date |
|---|---|---|
| 2,340,624 | Simmon | Feb. 1, 1944 |
| 2,386,575 | Simmon et al. | Oct. 9, 1945 |
| 1,804,680 | Fairchild | May 12, 1931 |